United States Patent
Zatloukal et al.

(10) Patent No.: US 7,373,182 B2
(45) Date of Patent: May 13, 2008

(54) WIRELESS MOBILE PHONE INCLUDING A HEADSET

(75) Inventors: Peter Zatloukal, Duvall, WA (US); Robert M. Heddle, Kirkland, WA (US); Christopher J. Dabrowski, Seattle, WA (US)

(73) Assignee: Varia Mobil LLC, Seattle, WA (US)

( * ) Notice: Subject to any disclaimer, the term of this patent is extended or adjusted under 35 U.S.C. 154(b) by 1161 days.

(21) Appl. No.: 10/087,032

(22) Filed: Mar. 1, 2002

(65) Prior Publication Data

US 2004/0192402 A1  Sep. 30, 2004

(51) Int. Cl.
*H04M 1/00* (2006.01)

(52) U.S. Cl. .............................. 455/569.1; 455/569.2; 455/575.1; 455/575.2; 455/90.3; 379/430; 379/420.03; 381/74

(58) Field of Classification Search .. 455/569.1–569.2, 455/575.1–575.2, 556.1, 557, 575.9, 90.3; 381/74; 379/430, 420.01–420.04, 422–423, 379/441–442

See application file for complete search history.

(56) References Cited

U.S. PATENT DOCUMENTS

| | | | | |
|---|---|---|---|---|
| 1,608,645 A | * | 11/1926 | Bruce, Jr. ................... | 455/350 |
| 2,899,549 A | * | 8/1959 | Potter ........................ | 455/269 |
| 3,130,269 A | * | 4/1964 | Rountree .................... | 381/78 |
| 4,634,816 A | * | 1/1987 | O'Malley et al. ........... | 379/430 |
| 4,683,587 A | * | 7/1987 | Silverman ................... | 381/311 |
| 5,438,702 A | * | 8/1995 | Jackson ..................... | 455/575.2 |
| 5,596,638 A | | 1/1997 | Paterson et al. | |
| 5,613,222 A | * | 3/1997 | Guenther ................. | 455/575.2 |
| 5,761,298 A | * | 6/1998 | Davis et al. ................ | 379/430 |
| 5,794,163 A | | 8/1998 | Paterson et al. | |
| 5,845,197 A | * | 12/1998 | Hada et al. ............... | 455/569.1 |
| 5,884,199 A | * | 3/1999 | Maki ........................ | 455/575.1 |
| 5,978,689 A | * | 11/1999 | Tuoriniemi et al. ....... | 455/569.1 |
| 5,982,904 A | | 11/1999 | Eghtesadi et al. | |
| 6,230,029 B1 | | 5/2001 | Hahn et al. | |
| 6,374,126 B1 | * | 4/2002 | MacDonald, Jr. et al. ................... | 455/569.1 |
| 6,397,087 B1 | * | 5/2002 | Kim et al. ................ | 455/569.1 |
| 6,424,820 B1 | * | 7/2002 | Burdick et al. ............ | 455/41.1 |
| 6,438,248 B1 | * | 8/2002 | Kamimura et al. ......... | 381/374 |
| 6,522,765 B1 | * | 2/2003 | Towle ........................ | 381/370 |
| 6,594,366 B1 | * | 7/2003 | Adams ........................ | 381/74 |
| 6,658,274 B1 | * | 12/2003 | Yang ........................ | 455/575.1 |
| 6,889,043 B2 | * | 5/2005 | Okazaki et al. ........... | 455/435.1 |
| 2001/0050993 A1 | * | 12/2001 | Douglas .................... | 381/71.6 |

(Continued)

*Primary Examiner*—Sharad Rampuria
(74) *Attorney, Agent, or Firm*—Schwabe, Williamson & Wyatt, P.C.

(57) ABSTRACT

A wireless mobile phone is provided with an input-output interface and an output interface. The input-output interface may be employed singularly to facilitate removable attachment of a telephony headset to the phone to receive at least telephony audio signals from the phone, and to provide audio signals to the phone. Similarly, the output interface may be employed singularly to facilitate removable attachment of an audio output only headset to the phone to receive at least a selected one of telephony and non-telephony audio signals from the phone. However, the input-output interface and the output interface may also be used jointly to facilitate removable attachment of a two-plug headset to the phone to receive at least a selected one of telephony and non-telephony audio signals from the phone, and to provide audio signals to the phone.

11 Claims, 5 Drawing Sheets

U.S. PATENT DOCUMENTS

| | | | |
|---|---|---|---|
| 2002/0016188 A1* | 2/2002 | Kashiwamura | 455/568 |
| 2002/0049079 A1* | 4/2002 | Buckley et al. | 455/568 |
| 2002/0090982 A1* | 7/2002 | Hollstrom et al. | 455/569 |
| 2002/0094845 A1* | 7/2002 | Inasaka | 455/566 |
| 2002/0107053 A1* | 8/2002 | Petez et al. | 455/569 |
| 2003/0022703 A1* | 1/2003 | Reshefsky | 455/569 |
| 2003/0076952 A1* | 4/2003 | Ma | 379/430 |
| 2003/0104842 A1* | 6/2003 | Choi et al. | 455/569 |
| 2003/0176164 A1* | 9/2003 | Hefetz | 455/3.06 |
| 2004/0121819 A1* | 6/2004 | Vogel | 455/569.2 |

* cited by examiner

100

WIRELESS MOBILE PHONE INCLUDING A HEADSET

BACKGROUND OF THE INVENTION

1. Field of the Invention

The present invention relates to the field of wireless mobile phones, including headsets.

2. Background Information

Advances in computer and telecommunication technology have led to wide spread adoption of mobile client devices, in particular, wireless mobile phones. The term "wireless mobile phone" as used herein (in the specification and in the claims) refers to the class of telephone devices equipped to enable a user to make and receive calls wirelessly, notwithstanding the user's movement, as long as the user is within the communication reach of a service or base station of a wireless telephone service network. The term "wireless mobile phone" is to include the analog subclass as well as the digital subclass (of all signaling protocols).

A conventional wireless mobile phone typically includes an input-output interface, such as an input-output port, for removable attachment of a headset to the wireless mobile phone to facilitate receipt of telephony audio signals from the phone, and provision of telephony audio signals to the phone, for "hand-free" operation.

However, the next generation of wireless mobile phone is expected to be endowed with additional non-telephony functions, including functions such as radio and/or audio player, having non-telephony audio outputs.

Thus, an improved, in particular, a more user friendly input-output interface arrangement that efficiently supports the richer audio input/output environment is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a wireless mobile phone having an improved input-output arrangement, and a complementary headset to facilitate delivery of telephony and non-telephony audio to a user. In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

The phrase "in one embodiment" will be used repeatedly, however the phrase does not necessarily refer to the same embodiment, although it may. The terms "comprising", "including", "having", and other terms of the like, are used interchangeably, and their meanings are synonymous.

Figure 1:
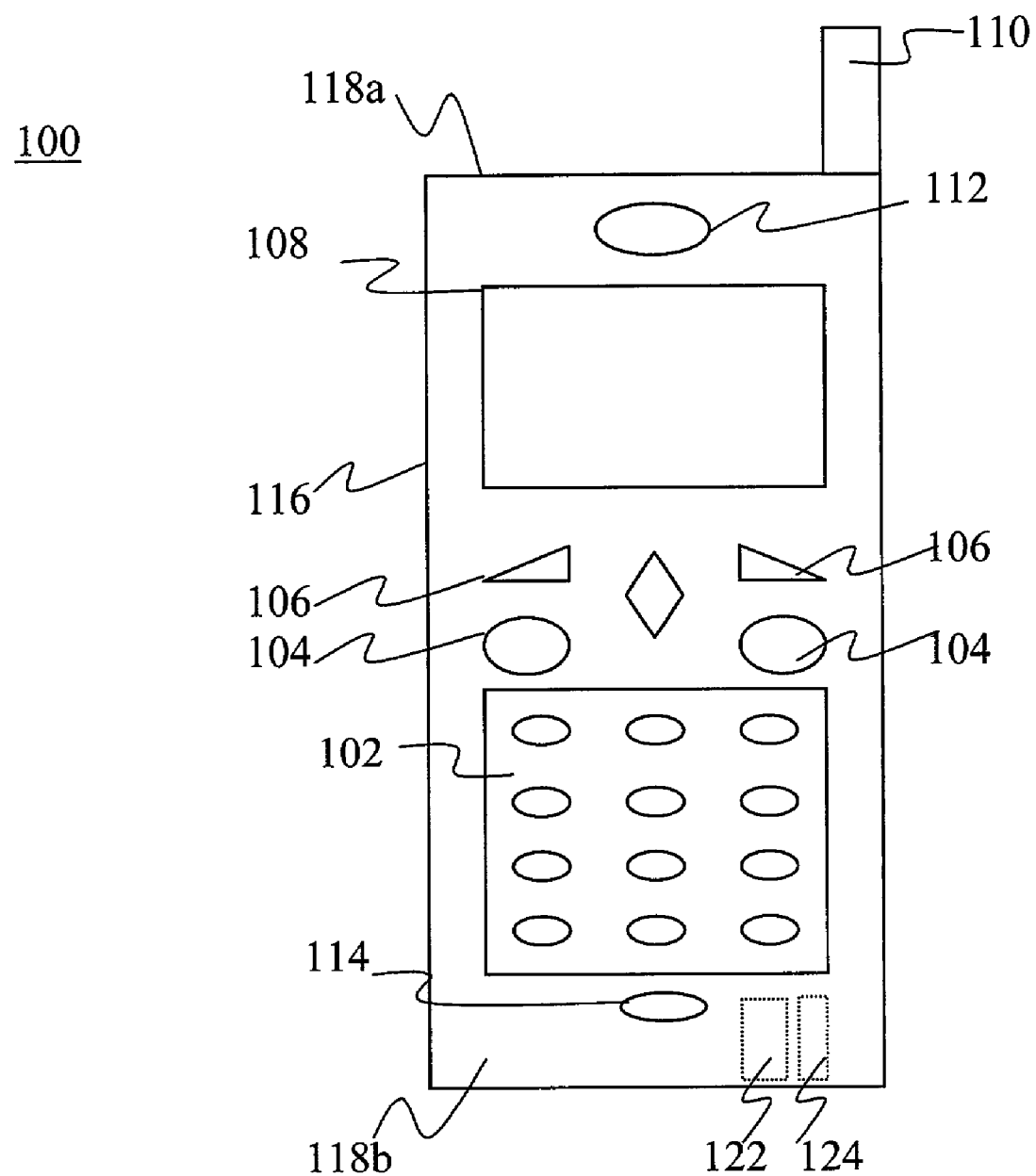
FIG. 1 illustrates an external view of a wireless mobile phone of the present invention, incorporated with the improved input-output interface arrangement of the present invention, in accordance with one embodiment.

FIG. 1 illustrates a wireless mobile phone 100 incorporated with the teachings of the present invention, in accordance with one embodiment. As illustrated, for the embodiment, wireless mobile phone 100 includes input keypad 102, "talk" and "end talk" buttons 104, cursor control buttons 106, display screen 108, antenna 110, ear speaker 112 and microphone 114, disposed relative to each other as shown. Wireless mobile phone 100 also includes palm-sized body casing 116 with top end 118a and bottom end 118b.

Further, and more importantly, in accordance with present invention, wireless mobile phone 100 includes an input-output interface arrangement having at least input-output interface 122 and output interface 124. In one embodiment, input-output interface 122 is an input-output port designed to accept a 2.5 mm 4-pin plug, whereas output interface 124 is an output port designed to accept a 1.8 in 3-pin plug. In alternate embodiments, other input-output as well as other output interfaces may be used instead. For the embodiment, interfaces 122-124 are disposed at the bottom end 118b of casing 116. In alternate embodiments, interfaces 122-124 may be disposed at the top end, left/right side wall, or other locations of design preference. Moreover, for the embodiment, wireless mobile phone 100 is endowed with additional non-telephony functions (not shown), including in particular a radio function (not shown), and an audio player function (not shown) having non-telephony audio outputs, which are outputted through interface 124.

As will be described in more details below, interfaces 122-124 are advantageously designed in a manner that allows each of interfaces 122-124 to be singularly employed to removably attach conventional telephony headsets and audio output only headsets to wireless mobile phone 100 respectively, as well as jointly employed to removably attach the complementary headset of the present invention, to be described more fully below referencing FIGS. 2a-2b.

For the embodiment, antenna 110, disposed at and extruded from top end 118a, in addition to being used to send and receive telephony signals, including audio as well as control signals (in a modulated or digitized manner), is also being used to receive radio signal with radio programming, to be described more fully below referencing FIG. 3. In alternate embodiments, a separate antenna may be employed to receive radio programming. In yet other alternate embodiments, antenna 110 may be disposed at and extruded from bottom end 118b, as described in co-pending U.S. patent application Ser. No. 09/767,526, filed Jan. 22, 2001, entitled "A WIRELESS MOBILE PHONE WITH INVERTED PLACEMENT OF ANTENNA AND INPUT KEYPAD".

For the embodiment, each of the other elements 102-108 and 112-114 performs its conventional function known in the art. For example, input keypad 102, disposed near bottom end 118b, facilitates a user in providing numeric or alphanumeric inputs, whereas "talk" and "end talk" buttons 104, disposed in the mid-section of phone 100, are used to start and end a call. Display screen 108, disposed near top end 118a, is used to echo numeric or alphanumeric inputs entered by a user, as well as to display various menu options, control information, and so forth. Cursor control buttons 106, disposed in the mid-section of phone 100, are used to facilitate a user in making various menu and/or option selections. Microphone 114, also disposed near bottom end 118b, is used to facilitate the user in providing audio input, whereas ear speaker 112, disposed near top end 118a, is used to facilitate outputting for the user, received audio. These elements and their operations will not be further described.

However, in alternate embodiments, input keypad 102 may also be equipped to enable a user to enter data and/or commands through stroking patterns, as described in co-pending U.S. patent application Ser. No. 09/767,197, filed Jan. 22, 2001, entitled "A WIRELESS MOBILE PHONE WITH KEY STROKING BASED INPUT FACILITIES".

Further, in alternate embodiments, wireless mobile phone 100 may also be endowed with other functionalities, such as encoded data entry facilities as described in co-pending U.S. patent application Ser. No. 09/975,287, filed Oct. 10, 2001, entitled "WIRELESS MOBILE PHONE WITH ENCODED DATA ENTRY FACILITIES", or luminescent signaling display capability as described in co-pending U.S. patent application Ser. No. 09/908,118, filed Jul. 17, 2001, entitled "LUMINESCENT SIGNALING DISPLAYS UTILIZING A WIRELESS MOBILE COMMUNICATION DEVICE".

Figure 2A:
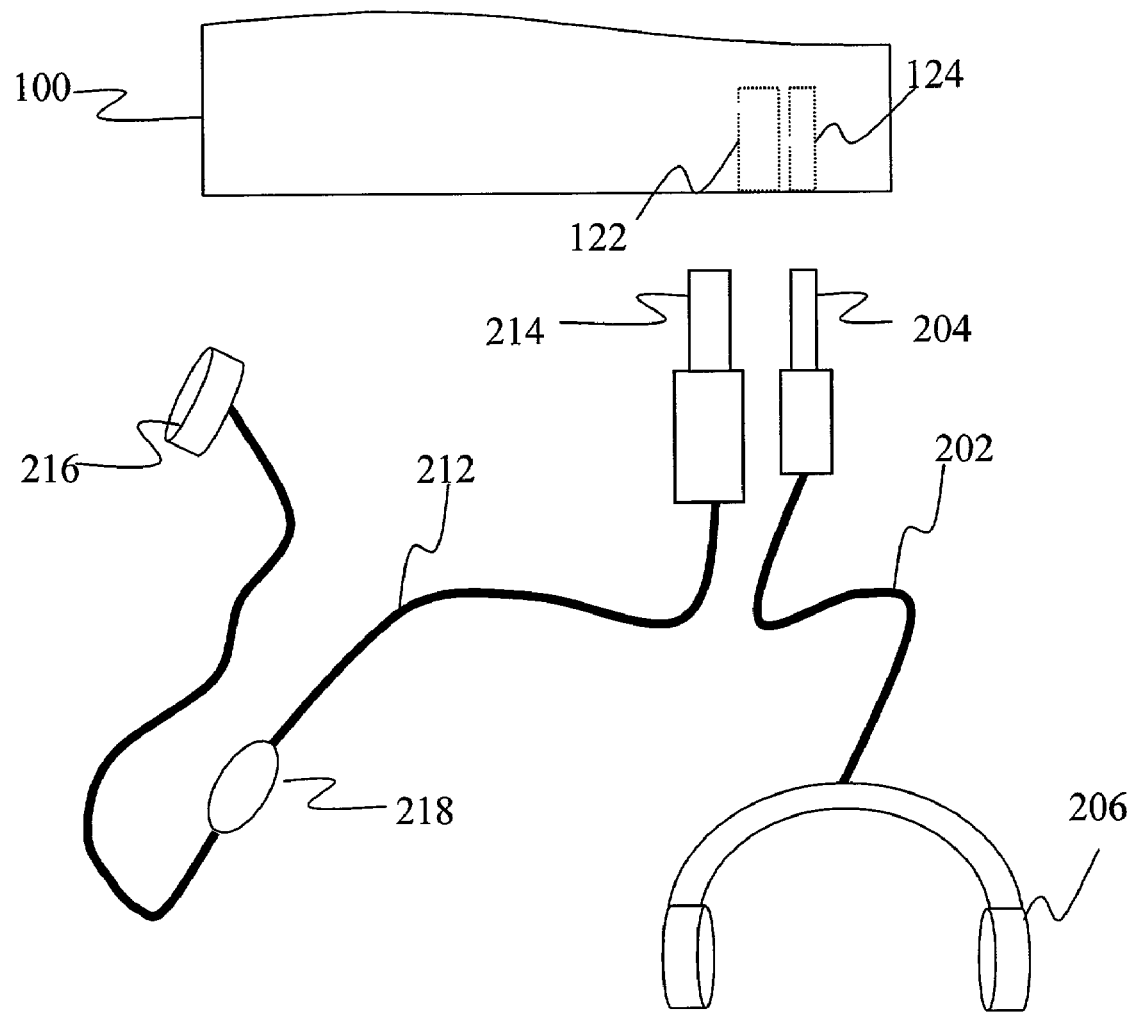
FIGS. 2a-2b illustrate various manners the improved input-output interface arrangement of FIG. 1 may be employed.
Figure 2B:
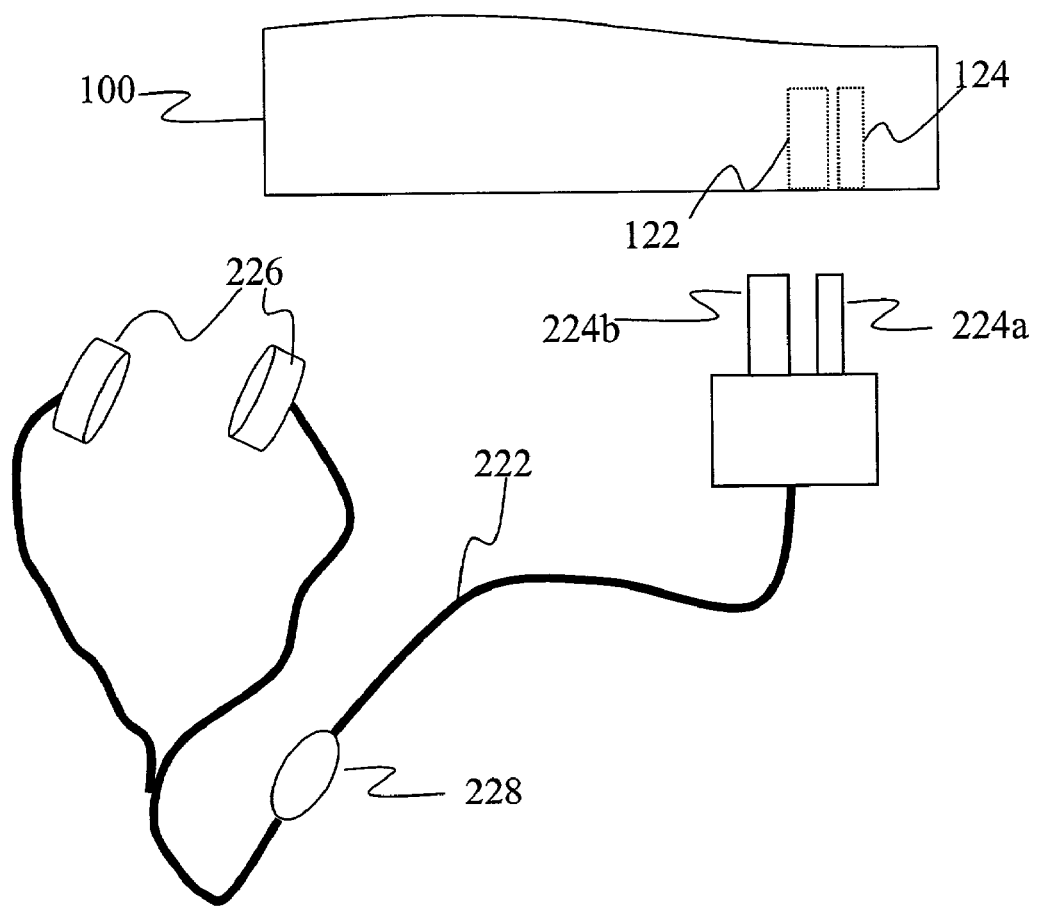

Referring now to FIGS. 2a-2b, wherein as alluded earlier, illustrate the various manners interface arrangement 122-124 may be singularly employed to removably attach conventional telephony headsets and audio output only headsets to wireless mobile phone 100 respectively, as well as jointly employed to removably attach the complementary headset of the present invention. As illustrated in FIG. 2a, a conventional telephony headset 212 having earpiece receiver 216, microphone 218 and plug 214 may be removably attached to wireless mobile phone 100, via input-output interface 122, and have telephony audio signals be transferred from wireless mobile phone 100 to earpiece receiver 216 or audio signals be transferred from microphone 218 to wireless mobile phone 100, to allow wireless mobile phone 100 to be used in a "hand free" manner. In one embodiment, plug 214 is a 2.5 mm 4-pin plug. In alternate embodiments, other connectors may be employed instead.

Further, a conventional audio output only headset 202 having earpiece receivers 206 and plug 204 may be removably attached to wireless mobile phone 100, via output interface 124, and have non-telephony audio signals be transferred from wireless mobile phone 100 to earpiece receiver 206. In one embodiment, plug 204 is a 1.8 in 3-pin plug. In alternate embodiments, other connectors may be employed instead.

However, as a result of at least the audio path arrangement of wireless mobile phone 100, complementary headset 222 of the present invention having earpiece receivers 226a-226b, microphone 228 and novel connector 230 with two plugs 224a-224a may be removably attached to wireless mobile phone 100, via input-output interface 122 and output interface 124, and have telephony as well as non-telephony audio signals be transferred from wireless mobile phone 100 to earpiece receivers 226 or audio signals be transferred from microphone 228 to wireless mobile phone 100, to allow wireless mobile phone 100 to be used in a "hand free" manner, as illustrated in FIG. 2b. The audio path of wireless mobile phone 100 as well as the wiring of connector 230 will be further described below referencing FIGS. 4 and 5 respectively.

In one embodiment, telephony headset 222 also includes send/end switch (not shown). For the embodiment, the send/end switch is disposed on the same casing in which microphone 228 is disposed. In one embodiment, plug 224b is a 2.5 mm 4-pin plug, while plug 224a is a 1.8 in 3-pin plug. In alternate embodiments, other connectors may be employed instead.

Figure 3:
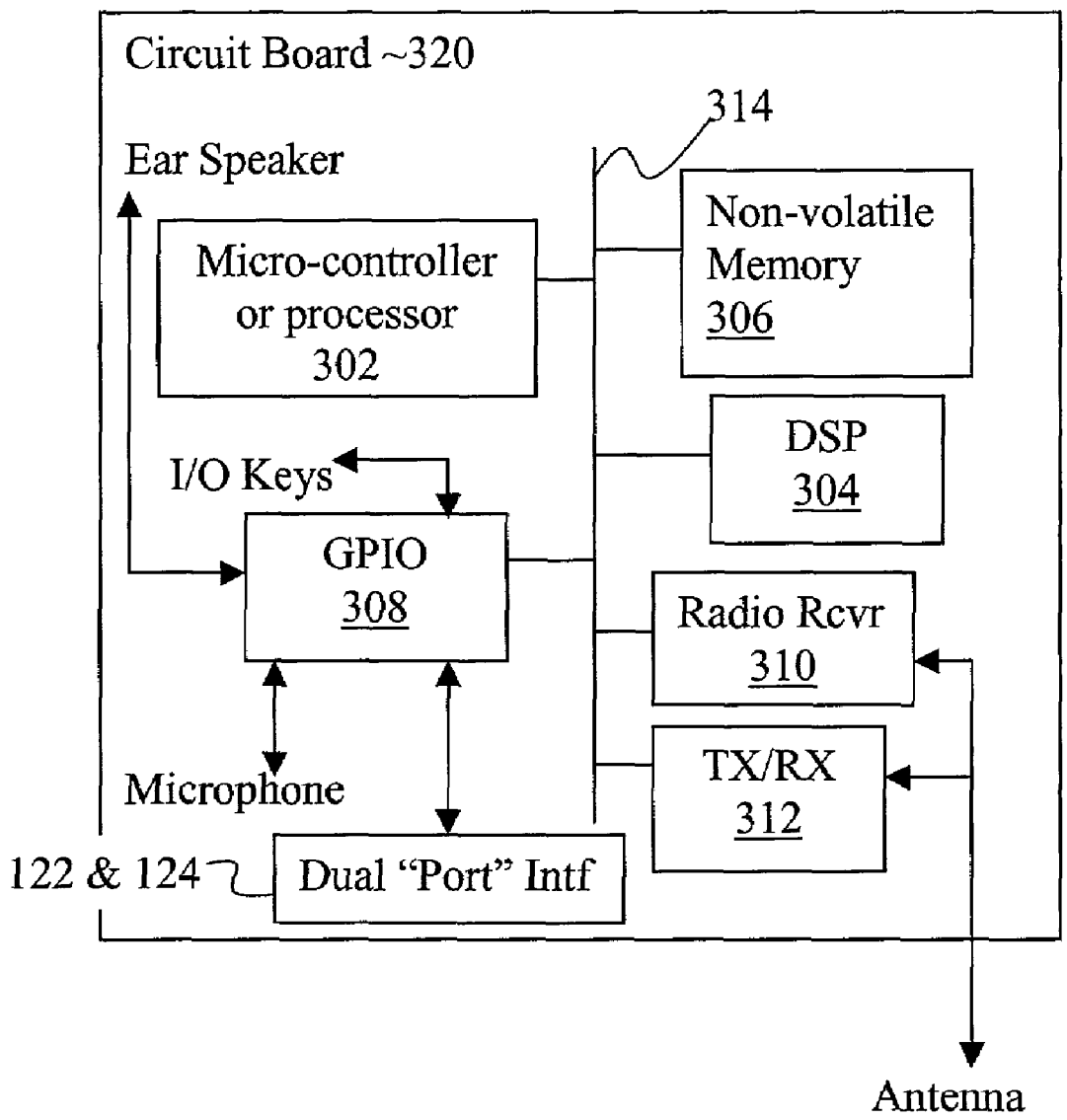
FIG. 3 illustrates an internal component view of the wireless mobile phone of the present invention, in accordance with one embodiment.

FIG. 3 illustrates an architectural view of a wireless mobile phone 100, in accordance with one embodiment. As illustrated, wireless mobile phone 100 includes elements found in conventional mobile client devices, such as microcontroller/processor 302, digital signal processor (DSP) 304, non-volatile memory 306, general purpose input/output (GPIO) interface 308, and transmit/receive (TX/RX) 312 (also known as a transceiver), coupled to each other via bus 314, and disposed on a circuit board 320. Additionally, in accordance with the present invention, wireless mobile phone 100 further includes the earlier described dual "port" interface 122 and 124, which as illustrated is coupled to GPIO 308. Further, for the embodiment, wireless mobile phone 100 also includes radio receiver 310 coupled to antenna 110, and a software implementation of an MP3 player (not shown).

At least radio receiver 310 and the MP3 player generate non-telephony audio signals for output through output interface 124.

Except for the earlier described dual "port" interface 122-124 and audio path of wireless mobile phone 100, to be described more fully below, each of these elements 302-314 performs its conventional function known in the art, and is intended to represent a broad range of such element and its equivalents. In particular, TX/RX 312 may support one or more of any of the known signaling protocols, including but are not limited to CDMA, TDMA, GSM, and so forth. Further TX/RX 312 may be implemented using separate transmitter and receiver.

Accordingly, elements 302-314 will not be further described.

Figure 4:
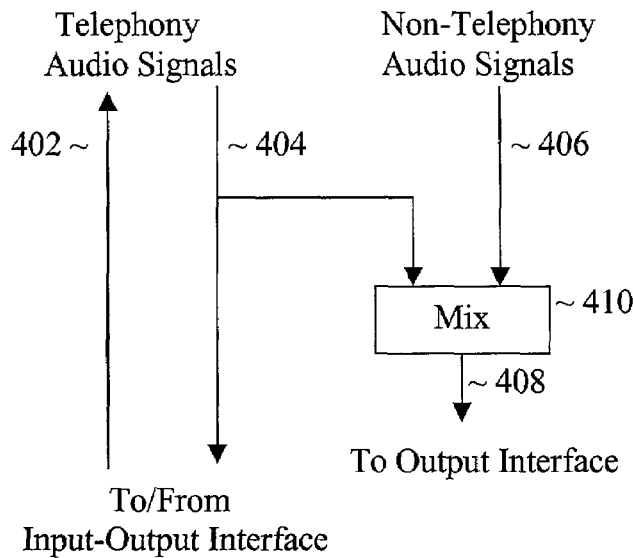
FIG. 4 illustrates the audio paths of the wireless mobile phone of FIG. 1, in accordance with one embodiment.

FIG. 4 illustrates the audio path of wireless mobile phone 100 of FIGS. 1 and 3, in accordance with one embodiment. As illustrated, for the embodiment, telephony audio signals 404 (including ring tone), in addition to being coupled to output through input-output interface 122, telephony audio signals 404 are also mixed with non-telephony audio signals 406 outputted by audio functions such as the earlier mentioned radio programming and media player (like MP3), and outputted through output interface 124. Audio signals 402 from a telephony headset 212 or 222 are provided to wireless mobile phone 100 through input-output interface 122.

Accordingly, when input-output interface 122 is singularly employed for a telephony headset, such as headset 212, telephony audio signals are properly delivered to the headset. Similarly, when output interface 124 is singularly employed for an audio output only headset, such as headset 202, telephony as well as non-telephony audio signals are properly delivered to the headset.

However, by virtue of the novel wiring of connector 230 of complementary headset 222 of the present invention, to be described in further detail below, referencing FIG. 5, only one set of the telephony audio signals is properly delivered to the earpiece receivers 226 of headset 222; the other set of telephony audio signals is advantageously removed.

Figure 5:
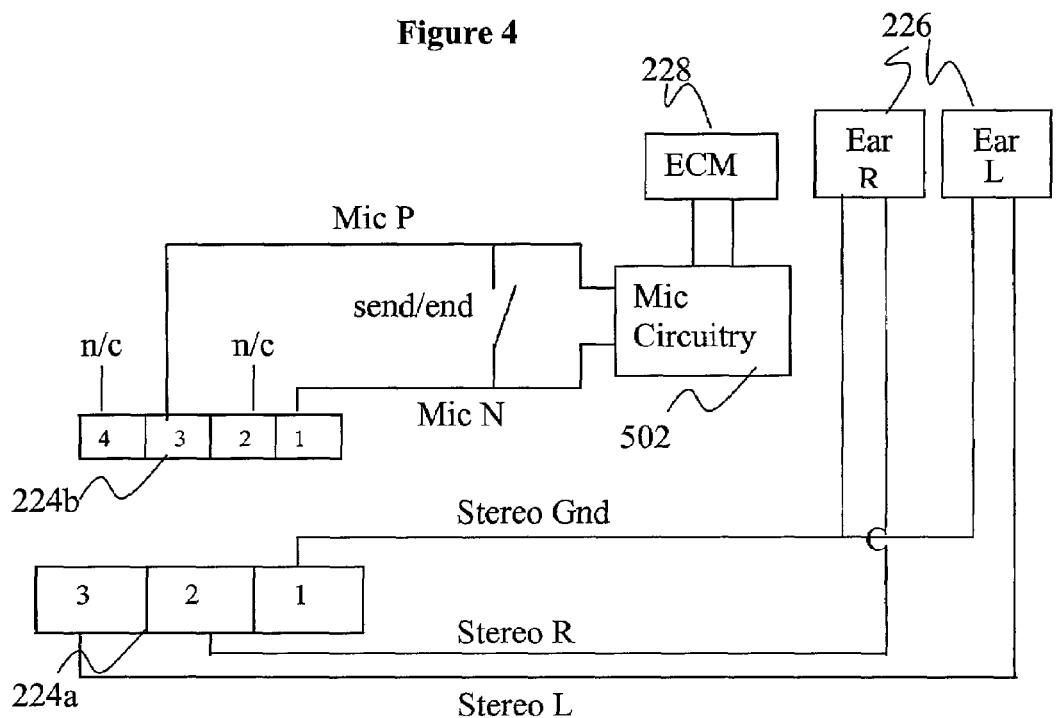
FIG. 5 is a schematic diagram illustrating the internal wiring of the novel headset of the present invention, in accordance with one embodiment.

FIG. 5 illustrates the wiring of connector 230 of FIG. 2 in further details, in accordance with one embodiment. As illustrated, for the embodiment, pins 2 and 3 of 3-pin plug 224a designed to engage output port 124, are coupled to the right and left earpiece receivers 226 respectively, whereas pin 1 of 3-pin plug is coupled to both earpiece receivers 226.

Electret condenser microphone (ECM) 228 is coupled to microphone (mic) circuitry 502, which in turn is coupled to pins 1 and 3 of 4-pin plug 224*b* in parallel. The connections between mic circuitry 502 and pins 1 and 3 are further subject to the condition of the send/end switch. More importantly, pins 2 and 4 of 4-pin plug 224*b* are not coupled to earpiece receivers 226. For the embodiment, no connections are provided for pins 2 and 4 of 4-pin plug 224*b* at all.

Accordingly, telephony and/or non-telephony audio signals may be provided from wireless mobile phone 100 to earpiece receivers 226 through output port 124 and 3-pin plug 224*a*, while audio signals may be provided from microphone 228 to wireless mobile phone 100 through 4-pin plug 224*b* and input-output port 122. However, telephony audio signals output from wireless mobile phone 100 are advantageously non delivered to earpiece receivers 226, thereby avoiding interference with the identical telephony audio signals or non-telephony audio signals delivered to earpiece receivers 226 through output port 124 and 3-pin plug 224*a*.

Thus, a user having made a prior investment on a conventional audio only output headset, such as headset 202, may continue to use the same conventional audio only output headset 202 to enjoy the non-telephone audio signals output through output interface 124, by removably attaching the conventional audio only output headset 202 to output interface 124. A user having made a prior investment on a conventional telephony headset, such as headset 212, may also continue to use the same conventional telephony headset 212 to operate wireless mobile phone 100 in a hand free manner, by removably attaching the conventional telephony headset 212 to input-output interface 122. In each case, the user is protected with respect to his/her prior investment in headsets 202 and 212.

However, a user elected to invest in the complementary headset 222 of the present invention, may use the complementary headset 222 to enjoy the non-telephony audio programming, properly receiving the non-telephony audio signals in earpiece receivers 226, as well as to operate wireless mobile phone 100 in a "hand free" manner, properly receiving the telephony audio signals in earpiece receivers 226 and providing the telephony audio signals from microphone 228 to wireless mobile phone 100, by removably attaching complementary headset 222 to wireless mobile phone 100 through input-output interface 122.

In other words, wireless mobile phone 100 advantageously provides additional functions having non-telephony outputs, and a novel audio input/output interface arrangement 122-124 that provides new users with the opportunity to employ the new complementary headset 222, and yet for users having made prior investments in headsets 202 and/or 212, the flexibility of making additional investment in the new complementary headset 222, or continuing to leverage on the prior invested headsets 202 and/or 212.

Accordingly, a wireless mobile phone having an improved input-output interface arrangement, and a complementary headset has been described. While the present invention has been described in terms of the above illustrated embodiments, in particular, in term of wireless mobile phones, those skilled in the art will recognize that the invention is not limited to the embodiments described. The present invention can be practiced with modification and alteration within the spirit and scope of the appended claims, or on other wireless communication devices. Thus, the description is to be regarded as illustrative instead of restrictive on the present invention.

What is claimed is:

1. A wireless mobile phone comprising:
   telephony means for wirelessly sending and receiving telephony signals;
   audio means for generating non-telephony audio signals;
   an input-output interface to facilitate removable attachment of a first headset to said wireless mobile phone, and output of telephony audio signals to said first headset, and/or input of audio signals to said wireless mobile phone;
   an output interface to facilitate removable attachment of a second headset to said wireless mobile phone, and output of at least a selected one of telephony and non-telephony audio signals for said first headset; and
   audio signal paths to couple said input-output interface and said output interface to said telephony means and said audio means in a manner, to allow said input-output interface to be singularly employed for said first headset, said output interface to be singularly employed for said second headset, and said input-output and output interfaces to be jointly employed for said first and second headsets where said first and second headsets being the same headset.

2. The wireless mobile phone of claim 1, wherein telephony means comprises a wireless telephony signal transceiver.

3. The wireless mobile phone of claim 1, wherein said audio means comprises radio means for receiving and rendering radio programming.

4. The wireless mobile phone of claim 1, wherein said audio means comprises a digital audio player.

5. The wireless mobile phone of claim 4, wherein said digital audio player comprises a MP3 player.

6. The wireless mobile phone of claim 1, wherein said input-output interface comprises an input-output port designed to accept a 2.5 mm input-output plug.

7. The wireless mobile phone of claim 1, wherein said output interface comprises an output port designed to accept an ⅛ inch audio plug.

8. The wireless mobile phone of claim 1, wherein said first headset is a telephony headset comprising a microphone and at least one earpiece receiver.

9. The wireless mobile phone of claim 1, wherein said second headset is an audio output only headset.

10. The wireless mobile phone of claim 1, wherein said first and second headsets the same headset, and said same headset comprises two complementary plugs to mate with said output interface and said input-output interface.

11. The wireless mobile phone of claim 1, wherein said wireless mobile phone is of a digital type.

* * * * *

UNITED STATES PATENT AND TRADEMARK OFFICE
CERTIFICATE OF CORRECTION

| | | |
|---|---|---|
| PATENT NO. | : 7,373,182 B2 | Page 1 of 1 |
| APPLICATION NO. | : 10/087032 | |
| DATED | : May 13, 2008 | |
| INVENTOR(S) | : Peter Zatloukal et al. | |

It is certified that error appears in the above-identified patent and that said Letters Patent is hereby corrected as shown below:

At col. 6, line 21, "non-telephony audio signals for said first headset;"

Should read -- non-telephony audio signals for said second headset; --

Signed and Sealed this

Twenty-fifth Day of May, 2010

David J. Kappos
*Director of the United States Patent and Trademark Office*